(12) United States Patent
Amrhein et al.

(10) Patent No.: US 11,493,144 B2
(45) Date of Patent: Nov. 8, 2022

(54) VALVE PISTON AND VALVE COMPRISING THE VALVE PISTON

(71) Applicant: Robert Bosch GmbH, Stuttgart (DE)

(72) Inventors: Bertram Amrhein, Weibersbrunn (DE); Daniel Schreier, Frammersbach (DE); Andreas Gehrling, Lohr (DE); Marco Gruebel, Neustadt (DE); Mark-Simon Schueler, Lohr am Main (DE); Mathias Wolff, Steinfeld (DE); Michael Cesinger, Lohr Am Main (DE); Rene Muecke, Thuengen (DE); Siegfried Olschyna, Frammersbach (DE); Steffi Neubauer, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/929,316

(22) Filed: Jul. 15, 2020

(65) Prior Publication Data
US 2021/0018113 A1      Jan. 21, 2021

(30) Foreign Application Priority Data

Jul. 16, 2019 (DE) ..................... 10 2019 210 488.6

(51) Int. Cl.
*F16K 31/122* (2006.01)
*F16K 31/126* (2006.01)

(52) U.S. Cl.
CPC ........ *F16K 31/122* (2013.01); *F16K 31/1262* (2013.01); *F16K 31/1264* (2013.01)

(58) Field of Classification Search
None
See application file for complete search history.

(56) References Cited

U.S. PATENT DOCUMENTS

| 2007/0056645 | A1 | 3/2007 | Arnold et al. |
| 2016/0290368 | A1 | 10/2016 | Collins |
| 2019/0024806 | A1* | 1/2019 | Cis ...................... F16K 11/0708 |

FOREIGN PATENT DOCUMENTS

| EP | 3067598 A1 * | 9/2016 | .......... F16K 11/0716 |
| WO | 2018/077659 A1 | 5/2018 | |

OTHER PUBLICATIONS

EP-3067598-A1, Machine Translation (Year: 2016).*
"Hydraulic Spool," aidro hydraulics & 3D printing, retrieved from Internet: https://www.aidro.it/3d-printed-solutions.html (6 pages).
"Wege-Schieberventile, direktgesteuert, mit Magnetbetätigung," Datasheet RD 23340 (German language document) (English-language version Datasheet RE 23340). Rexroth AG. Jul. 2015. (48 pages).

* cited by examiner

*Primary Examiner* — Daphne M Barry
(74) *Attorney, Agent, or Firm* — Maginot, Moore & Beck LLP

(57) ABSTRACT

A valve piston has a central axis along which mutually spaced control geometries are provided, which are bypassed by a passage that extends through the valve piston. The valve piston is, at least in portions, manufactured additively. A valve is includes a valve housing and a housing recess, in which the valve piston is received so that it is adjustable relative to the valve housing.

16 Claims, 4 Drawing Sheets

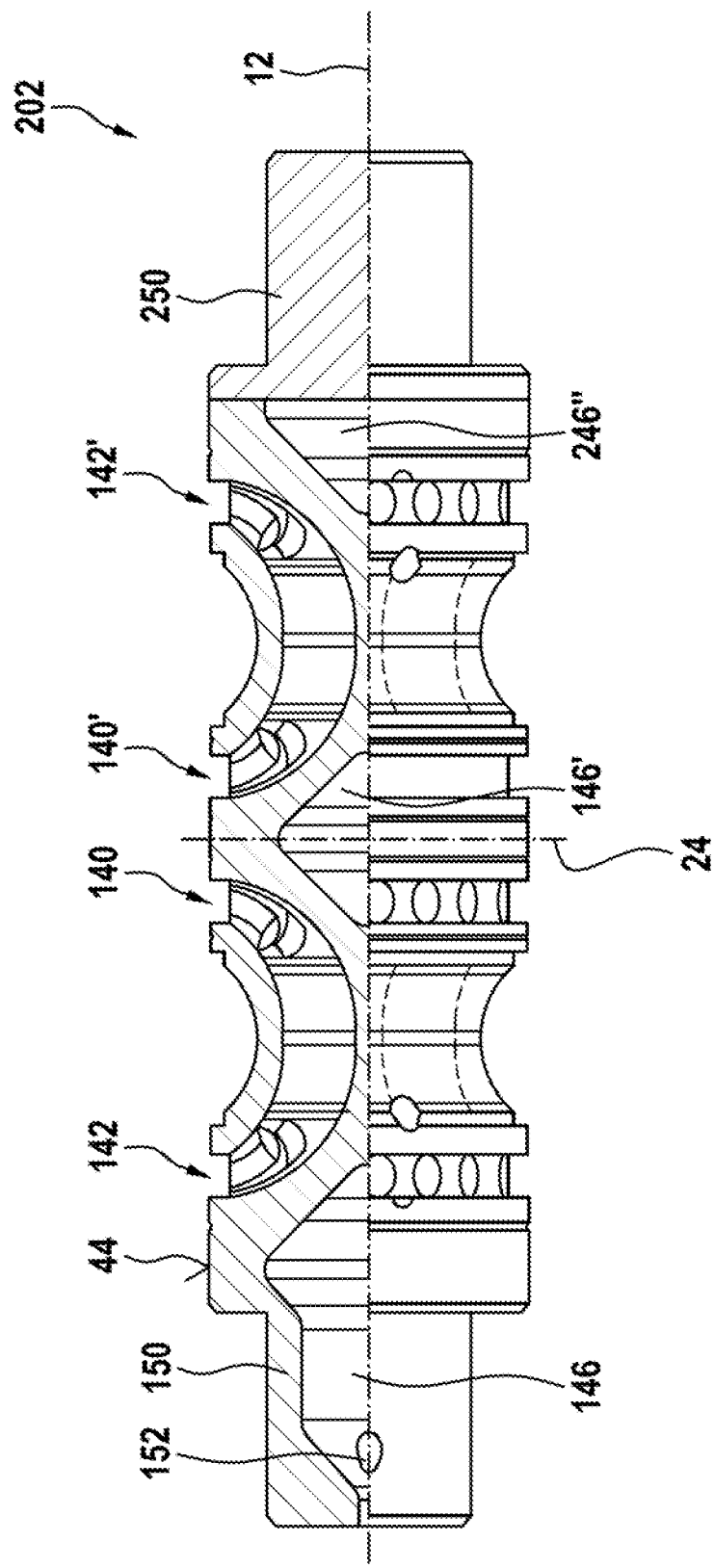

VALVE PISTON AND VALVE COMPRISING THE VALVE PISTON

This application claims priority under 35 U.S.C. § 119 to application no. DE 10 2019 210 488.6, filed on Jul. 16, 2019 in Germany, the disclosure of which is incorporated herein by reference in its entirety.

The disclosure relates to a valve piston and to a valve comprising the valve piston.

BACKGROUND

A valve, in particular a directional control valve, controls one or more hydraulic fluid connections between different pressure levels and a consumer. One feasible type of valve here is a slide valve, in order to be able to cater for a variety of hydraulic fluid connections. Such a valve has a valve housing, in which a valve piston is accommodated so that it is axially or rotationally displaceable according to the type of valve (sliding spool valve or rotary slide valve). Control geometries are provided on the valve piston, for example in the form of radially expanded control flanges with control edges, which interact with corresponding control geometries of the valve housing and thus form a restriction for the respective hydraulic fluid connection. Between the control geometries of the valve housing pressure chambers are formed in the valve housing, which are each connected to a different pressure level or to a consumer connection of the valve. The hydraulic fluid connections are opened, closed or restricted according to the adjustment of the valve piston and the resulting position of the control geometries.

For specific switching logics of the valve, its valve piston must comprise internal ducts, via which, assuming a specific valve piston position, one of the pressure chambers is or can be continuously connected to another of the pressure chambers, bypassing the control geometries. This is necessary for the operation of open-center pumps, for example, in which the pump in a neutral position with closed working connections has to be capable of circulating hydraulic fluid via the bypass.

According to the prior art, as shown in the data sheet RD23340 of the present applicant, for example, such valve pistons are conventionally manufactured from multiple machined elements, which are connected by joining processes, such as soldering, for example, to form a resulting valve piston. This is done, in particular, by soldering a turned pin, which has radially tapered portions, into a sleeve in the form of a milled part. The radial tapers together with the sleeve and their radial bores then constitute the said internal ducts.

A disadvantage with such solutions is that in principle three components: the pin, the sleeve and the solder, have to be provided, individually produced and joined. Pistons produced in this way therefore necessitate a long and complicated process chain, in which complex assembly and joining operations call for testing stages in order to verify the strength and fluid leak-tightness of the joined connections produced. This is particularly important since a maximum hydraulic system pressure of several hundred bar can occur in the internal ducts and the tank or ambient pressure may always be present on the outer end portion of the piston. Accordingly, considerable forces act on the joints. A further disadvantage is that, owing to the method of manufacture described, the internal ducts can scarcely be optimized to promote the flow and may have a relatively high pressure loss. Since this has to be compensated for by a greater pump output, this reduces the energy efficiency.

The additive manufacturing of such a hollow valve piston proves to be versatile and advantageous in terms of the production outlay. Thus, under https://www.aidro.it/3d-printed-solutions.html the firm aidro demonstrates a one-piece "hydraulic spool" hollow piston having a central internal duct.

One disadvantage of the solution shown is that the internal duct is formed in such a way that the flow of hydraulic fuel has dead zones, so that extensive turbulence of the hydraulic fluid flow is possible. For this reason, relatively unfavorable flow conditions may still occur with the continuing risk of a high pressure loss.

SUMMARY

In contrast to this, the object of the disclosure is to create a valve piston having an internal hydraulic fluid duct with improved or at least more influenceable hydraulic fluid flow. The object of the disclosure is furthermore to create a valve having reduced pressure loss in the internal hydraulic fluid duct.

The first object is achieved by a valve piston having the features described herein, the second by a valve having the features described herein. Advantageous developments of the disclosure are described in the following disclosure.

A valve piston, in particular a slide valve piston for a corresponding slide valve, in particular a directional control valve, has a central axis along which mutually spaced control geometries are provided, in particular for controlling a hydraulic fluid connection between two pressure chambers of the valve. These control geometries are formed, in particular, by or on control flanges, in particular radially expanded flanges. A control geometry here is a control surface or control edge and may be provided with control grooves, for example, particularly in order to improve a controllability of the hydraulic fluid connection. The said, spaced control geometries here are bypassed by a passage extending through the valve piston and are at least in part additively manufactured, and according to the disclosure, the passage is delimited towards the central axis, that is to say it does not extend as a simple, central passage in the valve piston but is rather separated by a radial distance from the central axis.

Delimitation towards the central axis means that the passage has an improved hydraulic fluid flow, or one that can at least be better influenced, compared to the additively manufactured passage according to the prior art. That is to say at least in that the hydraulic fluid flow can be optimized, particularly in terms of a pressure loss in the passage, not only by a specific radially outer configuration of the passage, but also by its radially inner delimitation towards the central axis. In one development the passage is delimited, at least towards the central axis, so as to optimize the flow, particularly with a view to minimizing any pressure loss.

The passage is preferably flow-optimized not only in portions but in its entirety, particularly with a view to minimizing any pressure loss.

In one development the passage is flow-optimized in such a way that a velocity profile of the hydraulic fluid flow in the passage is constant, at least in portions. For this purpose, the cross section is in particular variably configured along the passage.

A stroke direction is preferably defined by way of the central axis. In the case of a rotary piston the central axis is an axis of rotation for a rotational stroke, in the case of an axial piston the central axis is a stroke axis for an axial stroke.

The valve piston, not just the passage, is in portions or in its entirety preferably additively manufactured.

The additive manufacturing, in particular of the passage, renders the testing stages, in particular of the leak-tightness, superfluous due to the integral formation resulting from the additive manufacturing and the absence of joints.

The additive manufacturing inexpensively affords a design of the passage and of the entire valve piston that is flow-optimized to the full. In so doing significantly fewer limits are placed on the design than with conventional production.

The semi-finished product can be produced by machining or, for example, by casting.

In order to speed up and to optimize the production process, in one development the valve piston can be additively manufactured with at least one semi-finished product inserted. Thus at least a portion of the valve piston can be produced by means of a more cost-effective method than the cost-intensive additive manufacturing.

In a preferred development the semi-finished product is attached to an end portion of the valve piston, so that the latter can be removed from its assembly plate without any parting process. This also obviates the need for grinding-off or surface grinding of the assembly plate for production of the next component or valve piston. The assembly plate is therefore not subjected to any significant wear or abrasion.

The end portion is in particular a spring pintle on which a support spring or centering spring is or can be guided.

The additive manufacturing is preferably performed by means of power bed-based, selective laser melting. The preferred material is a steel processed by this method.

The material for the powder bed-based selective laser melting, that is to say the additive manufacturing, and the material of the semi-finished product or insert, are selected so that they can be welded by means of the laser jet. They are preferably identical, so that the same strength values inherent in the material can be assumed to exist or be present everywhere on the valve piston.

In one development the semi-finished product is additively joined by attaching it to the additively melted material and fusing it thereto. Or it is joined by adhesive bonding, welding or soldering.

In a preferred development the passage comprises at least one portion which is arched towards the central axis. In other words, it is bellied or arched inwards with a convex shape towards the central axis. This shape has a behavior more conducive to the flow than the linear shape with a large dead zone, for example, known in the prior art.

The shape arched or bellied towards the central axis may be of hyperbola-like formation, for example. For the purposes of the solution described, the term hyperbola-like encompasses not only a strictly mathematical hyperbola, but also other similarly arched or convex shapes. The shape may alternatively or additionally be derived, for example, from a regular geometry, such as a parabola, an ellipse or a circle, mixed shapes and/or succeeding portions of differing shape being possible.

Alternatively or in addition, the arched or bellied shape, in particular an inner circumferential surface or inner circumferential surfaces of the passage, may be formed by a free-form geometry, that is by a free-form surface. This then has the said bellied shape but cannot be attributed to a regular geometry.

In a preferred development the said portion having a shape arched or bellied towards the central axis is a central portion of the passage. The central portion here is arranged between at least one entry orifice and at least one exit orifice of the passage.

In one possible development the passage, in particular its central portion, comprises a system of hydraulic fluid ducts or is formed by the latter. The hydraulic fluid ducts here are in particular arranged so that they are equally distributed circumferentially. Here the system may be formed over all or part of the circumference.

In one development the system extends inside an enveloping volume which has a shape arched or bellied towards the central axis, in particular a hyperboloid-like shape. The said enveloping volume is to be seen as an outline geometry to illustrate the shape within which the system extends, that is to say not as a physically tangible feature.

For the purposes of the solution the same observations apply to the term "hyperboloid-like" as to the term "hyperbola-like"

In one development cross sections of the hydraulic fluid ducts vary along the central axis in order to optimize the flow, that is to say they have a variable cross section in the direction in which they extend, in particular for the purpose of optimizing the flow.

In one development, as an addition or alternative to the said system, the passage, in particular its central portion, comprises a collecting duct having an annular cross section or a sectorial cross section. In other words, the collecting duct is formed as an annular space or annular duct.

In one development the collecting duct is formed arched or bellied towards the central axis, particularly in a hyperboloid-like manner, in particular with both of its internal circumferential surfaces, one radially inner and one radially outer.

In one development a width of the annular cross section or sectorial cross section varies along the central axis or along the direction in which the collecting duct extends, in order optimize the flow and pressure loss.

In one development the valve piston has an outer circumferential surface in which orifices of the passage are provided on the one side of a first and on the other side of a second of the control geometries of the valve piston. The orifices here may be formed as bores. Alternatively, they may be additively manufactured. To further improve a flow inlet and outlet, they may be machined.

The orifices are preferably arranged so that they are distributed, in particular uniformly distributed, over the circumference.

In one development a portion of the outer circumferential surface is radially tapered, that is to say constricted radially inwards, towards the central axis in an area between the first and second control geometry. This shape results in a flow-optimized hydraulic fluid connection by way of the control geometry or in flow-optimized hydraulic fluid connections by way of the control geometries.

In one development at least a minority of the orifices have a directional component in the direction of the central axis, particularly in the stroke direction, or counter to this direction. This serves to optimize a flow inlet and/or outlet into or out of the passage.

The orifices point into the valve piston.

In one development the orifices arranged on the one side of the first control geometry point towards the orifices arranged on the other side of the second control geometry. In addition or alternatively, the latter point towards the former orifices.

In other words, the inlet and/or the outlet ensues at a shallow angle in relation to the outer circumferential surface at least in the area of a group of the orifices, and not perpendicular thereto, so that there, at least, the flow is deflected gently inside the passage.

In a weight-saving or at least production energy-saving development the valve piston comprises at least one additional cavity manufactured additively, at least in part. This cavity is either void, that is to say it no longer contains material of any kind, or it is filled with loose material not additively joined. In the latter case there is no weight saving, although the energy saving mentioned applies, since the material did not have to be heated and melted. In either case the cavity serves to reduce an additive design volume.

In one development the said cavity extends at least along a portion of the central axis, and around this, that is to say centrally in the valve piston. The cavity, like the valve piston generally itself, may in one development be formed as a rotational volume around its central axis, so that wall thicknesses of the valve piston are constant and their stability is uniform in all dimensions.

In one development the cavity extends through the valve piston along its central axis, in particular at least in the area between each of the outermost control geometries of the valve piston in the stroke direction of the valve piston. The said weight and/or energy saving is then particularly great.

In order to increase the stability of the passage, the cavity extends along a portion of the central axis other than the central portion of the passage. As a result, the passage is still supported by material towards the central axis and is thereby more stable. Here the portions over which the cavity and the central portion extend may have an overlap.

In one development the valve piston, particularly over the outer circumference or on an axial end face, has an outlet recess or opening, particularly in the form of a duct. This/these serve for the removal of unadded, that is to say loose material, from the cavity on the completion of additive manufacturing.

In one development the outlet recess is open, but alternatively it may be closed. The outlet opening is in particular closed by the aforementioned semi-finished product.

In one development the valve piston has a central control flange in the longitudinal extent of the valve piston, or alternatively a central radial taper, which extend on both sides of the central plane. Its normal is the central axis, which runs in the longitudinal extent. Here a series, comprising at least the said first and second control geometry, and at least the one aforementioned passage, is formed on both sides of the central control flange, or the central radial taper. In this way the valve piston is or can be designed in particular for a continuously adjustable 4/3-way or 4/3-way switching valve.

In one development the central plane is a plane of symmetry, so that the two series are arranged and/or formed symmetrically in relation to this.

In an alternative development the valve piston is asymmetrical, particularly in relation to a central plane, the normal of which is the central axis running in the longitudinal extent.

A valve, in particular a slide valve, in particular a directional control valve, of sliding spool or rotary slide valve type, has a valve housing with a housing recess having a central axis, in which a valve piston according to at least one aspect of the preceding description with its aligning central axis is adjustably received. In the case of a sliding spool valve the adjustment is axial, in the case of a rotary slide valve the adjustment is provided via the rotation of the valve piston. Here at least two mutually spaced control geometries corresponding to the control geometries of the valve piston already mentioned are provided on the housing recess along the central axis. Here a first pressure chamber is formed on the one side of a first of the control geometries of the housing recess, a second pressure chamber on the other side of a second of the control geometries of the housing recess, and a third pressure chamber in the valve housing between the two control geometries of the housing recess. Here, at least in one position of the valve piston, the first pressure chamber has a fluid connection to the second pressure chamber via the passage, bypassing the control geometries and the third pressure chamber. This is preferably a neutral position.

In one development of the valve the first pressure chamber is or can be connected to a hydraulic fluid source, in particular a high-pressure chamber, the second pressure chamber to a hydraulic fluid sink, in particular a low-pressure chamber or tank space. The third pressure chamber is or can be connected in particular to a working connection of the valve.

In a preferred development the valve is formed symmetrically about the aforementioned plane of symmetry in respect of the control geometries and pressure chambers of the valve housing.

BRIEF DESCRIPTION OF THE DRAWINGS

Several exemplary embodiments of a valve according to the disclosure and a valve piston according to the disclosure are represented in the drawings. The disclosure is now explained in more detail, referring to the figures of these drawings, of which:

FIG. 4 shows a valve body according to the disclosure in a longitudinal section according to a third exemplary embodiment.

DETAILED DESCRIPTION

Figure 1A:
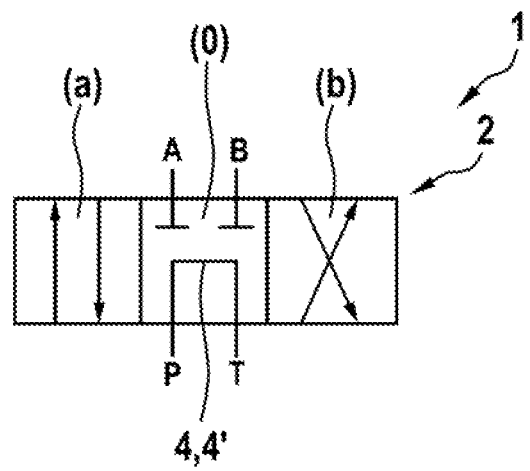
FIG. 1a and FIG. 1b show a respective switching logic of a valve according to the disclosure.
Figure 1B:
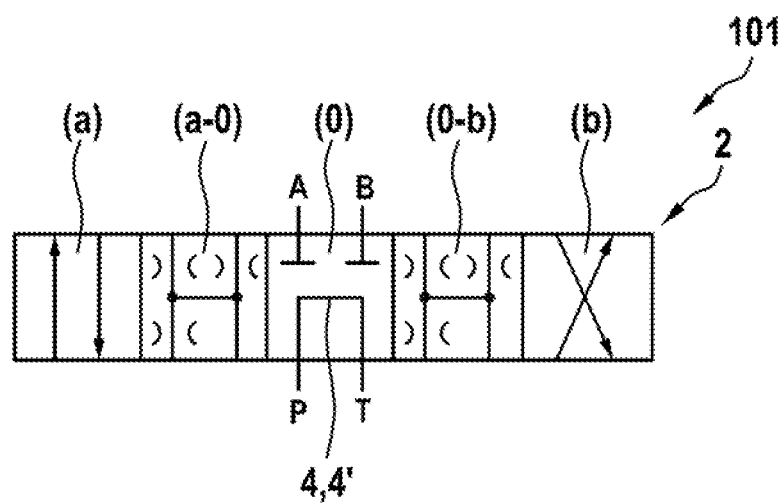

FIGS. 1a and 1b show two exemplary embodiments of a 4/3-way directional control valve 1; 101. The valve according to FIG. 1a is designed as a switching valve and has three positions 0, a, b. In addition, it has four connections, a pressure connection P for connection to a hydraulic fluid source, for example a hydraulic pump, a low-pressure connection T for connection to a hydraulic fluid sink, in particular a tank, a first working connection A, and a second working connection B, in each case for connection to a hydrostatic consumer or actuator. In the first position a the pressure connection P is connected to the first working connection A and the second working connection B is connected to the low-pressure connection T. In the second position b the first working connection A is connected to the low-pressure connection T and the high-pressure connection P is connected to the second working connection B. In the central or neutral position 0 the high-pressure connection P has a hydraulic fluid connection to the low-pressure connection T via a passage 4, 4' formed inside a valve piston 2. The hydraulic fluid connection here bypasses control geometries of the valve piston 2 and the valve housing, as is explained in more detail with reference to FIGS. 2 to 4.

The valve 1 according to FIG. 1a is, as already mentioned, designed as a switching valve, that is to say it has only the said three switching positions a, 0, b. The actuation, or rather more accurately the centering, into the central position 0 is provided by centering springs (not shown) arranged on both sides of the valve piston 2. The actuation into the respective positions a, b is done in each case by solenoids (not shown). Here some other method of actuation, for example hydraulic or pneumatic, may obviously be provided.

The valve 101 according to FIG. 1b differs from the first exemplary embodiment according to FIG. 1a in that it is continuously adjustable and therefore has the restriction positions a-0 and 0-b between the positions a, 0, b. Otherwise the switching logic of the valve 101 is identical in terms of the connections P, T, A, B, the positions a, b and the valve piston 2 and the passage 4. The facility for continuous adjustment allows the intermediate positions a-0 and 0-b.

Figure 2:
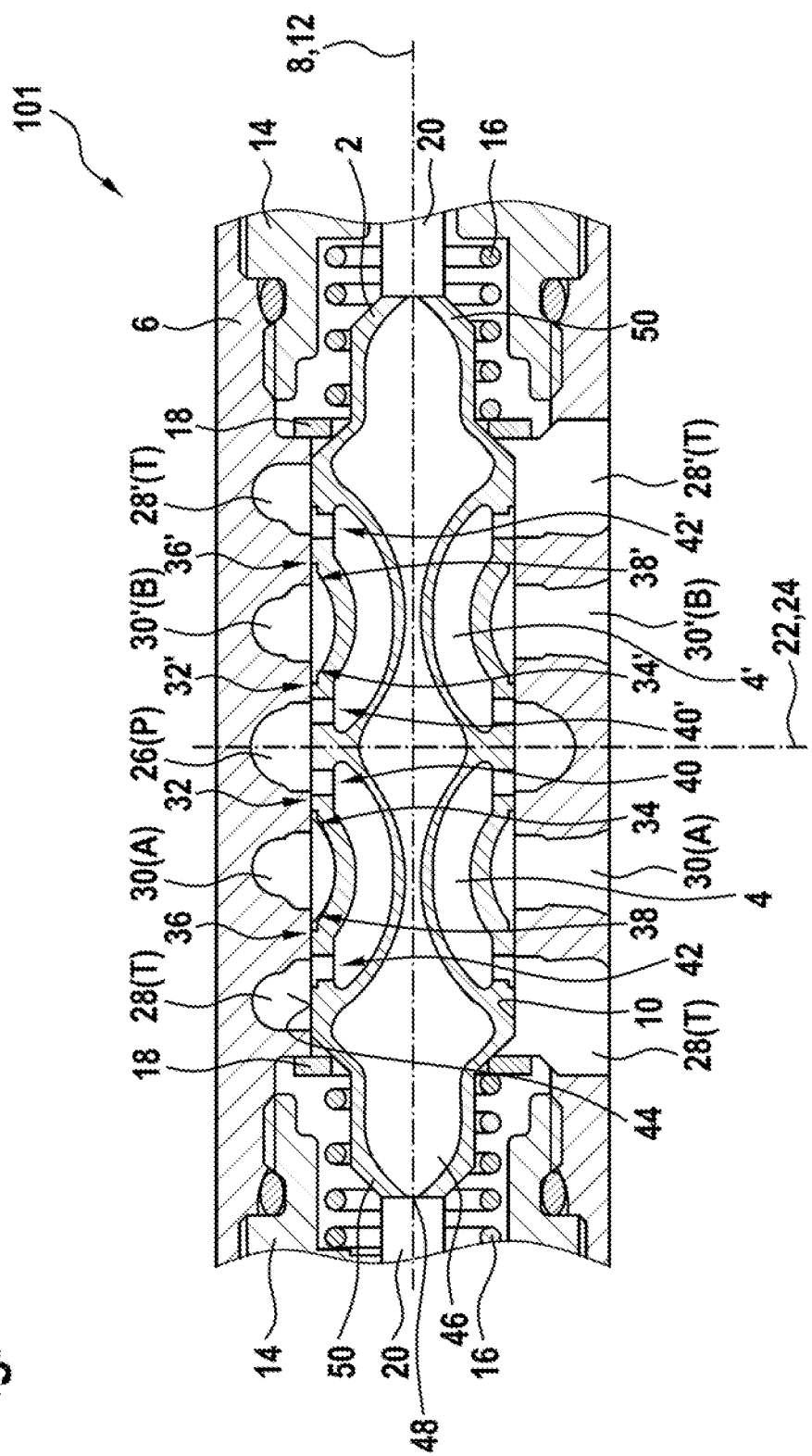
FIG. 2 shows a valve according to the disclosure in a longitudinal section according to a first exemplary embodiment.

FIG. 2 shows the valve 101 according to FIG. 1b with a first exemplary embodiment of a valve piston 2 according to the disclosure. The valve 101 has a valve housing 6 in which a passage recess 10 is provided along a central or bore axis 8. In the passage recess 10 the valve piston 2 is received so that it is axially displaceable along its central axis 12 aligning with the central axis 8. On its end portions the passage recess 10 is closed on both sides by a screw plug 14 and sealed off from the atmosphere. The screw plugs 14 are each of cupped shape design and comprise a centering spring 16, which is supported on a base of the respective centering screw 14. On its end portion opposite each said base, the respective centering spring 16 is supported on a spring plate 18, which in the central position 0 represented in FIG. 2 bears on a respective conical end face of the valve piston 2. Thus, the valve piston 2 is centered in the neutral position by the centering springs 16 (cf. FIGS. 1a and 1b). Respective solenoids of the valve 101, which are capable of exerting an adjusting action on the valve piston 2 via actuating pintles 20 bearing on the end portions of the valve piston 2, are not shown.

In the area represented according to FIG. 2 the valve housing 6 has a plane of symmetry 22 with which a plane of symmetry 24 of the valve piston 2 coincides when it is in its neutral position shown. Centrally, on both sides of the plane of symmetry 22, the passage recess 10 has a radial expansion in the form of a first pressure chamber or annular camber 26, which is in constant hydraulic fluid connection with the high-pressure connection P. In FIG. 2 to the left of the plane of symmetry 22 the passage recess 10 comprises a radially expanded second pressure chamber 28. Between the first pressure chamber 26 and second pressure chamber 28 the passage recess 10 comprises a radially expanded third pressure chamber 30. In FIG. 2 to the right of the plane of symmetry 22 a second pressure chamber 28' is provided as a lateral inversion of the second pressure chamber 28 and a third pressure chamber 30' as a lateral inversion of the third pressure chamber 30.

According to FIG. 1b and FIG. 2 the first pressure chamber 26 is in permanent hydraulic fluid connection with the high-pressure connection P. The second pressure chambers 28, 28' are in permanent hydraulic fluid connection with the low-pressure connection T, the third pressure chamber 30 is in permanent hydraulic fluid connection with the first working connection A and the third pressure chamber 30' is in permanent hydraulic fluid connection with the second working connection B. Here the second pressure chambers 28, 28' are each connected to a spring chamber, in which the centering spring 16 is accommodated, so that the low or tank pressure is always present on end portions of the valve piston 2.

According to FIG. 2 the valve piston 2 to the left of the plane of symmetry 22 has a first control geometry 32 in the form of a radial flange portion, which is or can be brought into circumferential contact with a first control geometry 34 of the valve housing 6. Spaced at a distance from this, further to the left in FIG. 2, the valve piston 2 has a second control geometry 36 in the form of a radial flange, which is in contact with a second control geometry 38 of the valve housing 6. The third pressure chamber 30 extends between the first control geometries 34 and 38 of the valve housing 6. From the plane of symmetry 22, the first pressure chamber 26 extends on the one side of the first control geometry 34 of the valve housing 6, whilst the second pressure chamber 28 extends on the other side of the second control geometry 38 of the valve housing. Corresponding to the first control geometries 32, 34, second control geometries 36, 38 and the second pressure chamber 28 and third pressure chamber 30, first control geometries 32', 34', second control geometries 36', 38' and the second pressure chamber 28' and third pressure chamber 30' are provided to the right of the plane of symmetry 22.

Through displacement/adjustment of the valve piston 2 into the limit position a or into the position a-0 according to FIG. 1b, the high-pressure connection P can establish a hydraulic fluid connection to the first working connection A via the restricted cross section between the valve piston 2 and the valve housing 6 formed by the first control geometries 32, 34. In the intermediate positions a-0 according to FIG. 10b, the restricted hydraulic fluid connection of all working connections P, T, A, B is established.

The position b or the positions 0-b according to FIG. 1b can be assumed through shifting of the valve piston 2 in FIG. 2 to the left.

The valve piston 2 is manufactured entirely additively in one piece. It has a passage 4, 4' formed as a collecting duct according to the disclosure on either side of its plane of symmetry 24 respectively. In the neutral position 0 represented according to FIG. 2 the first pressure chamber 26 has a hydraulic fluid connection to the second pressure chamber 28 via the passage 4, and the first pressure chamber 26 to the second pressure chamber 28' via the passage 4'. The hydraulic fluid connection here in each case bypasses the control geometries 32 to 38, and 32' to 38'.

The passages 4, 4' here have a shape arched or bellied towards the central axis 12 of the valve piston 2 and are delimited towards the central axis 12. In contrast to the prior art, therefore, a central passage without a radially inner circumferential surface is not formed. The topological delimitation towards the central axis 12 means that the respective passage 4, 4' can be optimized yet further, so that the respective hydraulic fluid flow from the first pressure chamber 26 can be more precisely guided towards the second pressure chambers 28, 28'. The pressure loss can thereby be reduced.

According to FIG. 2 this is realized so that the passages 4, 4' are arched or bellied towards the central axis 12. As a result, the hydraulic fluid flow in the respective passage 4, 4' does not experience a sharp or abrupt deflection and there is no longer any great dead zone, so that concomitant turbulences with resulting pressure loss are at least reduced or completely precluded.

The passage 4, 4', in each case proceeding from the plane of symmetry 24, has a first group of orifices 40, 40' uniformly distributed over the circumference on the one side of the first control geometry 32, 32' and a second group of orifices 42, 42' uniformly distributed over the circumference on the other side of the second control geometry 36, 36'. The orifices 40, 42, 40', 42' are oriented perpendicularly to an outer circumferential surface 33 of the valve piston 2, which also carries the first and second control geometries 32, 36, 32', 36' of the valve piston. The outer circumferential surface 44 is radially tapered in an area between the first control geometries 32, 32' and second control geometries 36, 36', that is to say like the passage 4, 4' it is convexly arched towards the central axis 12 of the valve piston 2. As a result, a hydraulic fluid flow from the first pressure chamber 26 to each of the third pressure chambers 30 and 30', and between the third 30 and second pressure chamber 28, or 30' and 28' respectively, is flow-optimized.

A likewise additively manufactured continuous cavity 46 along the central axis 8 helps to reduce the weight of the valve piston 2. This cavity is configured as a rotational body around the central axis 12 of the valve piston 2. At the same time, at the ends on each of the end portions of the valve piston 2 in the direction of the central axis 8, it has an outlet recess 48, via which material present in the cavity 46 that has not been additively joined is removed following the manufacturing process. In the operation of the valve piston 2 the recess 48 is closed by the adjacent actuating pintle 20 of the solenoids (not shown).

Figure 3:
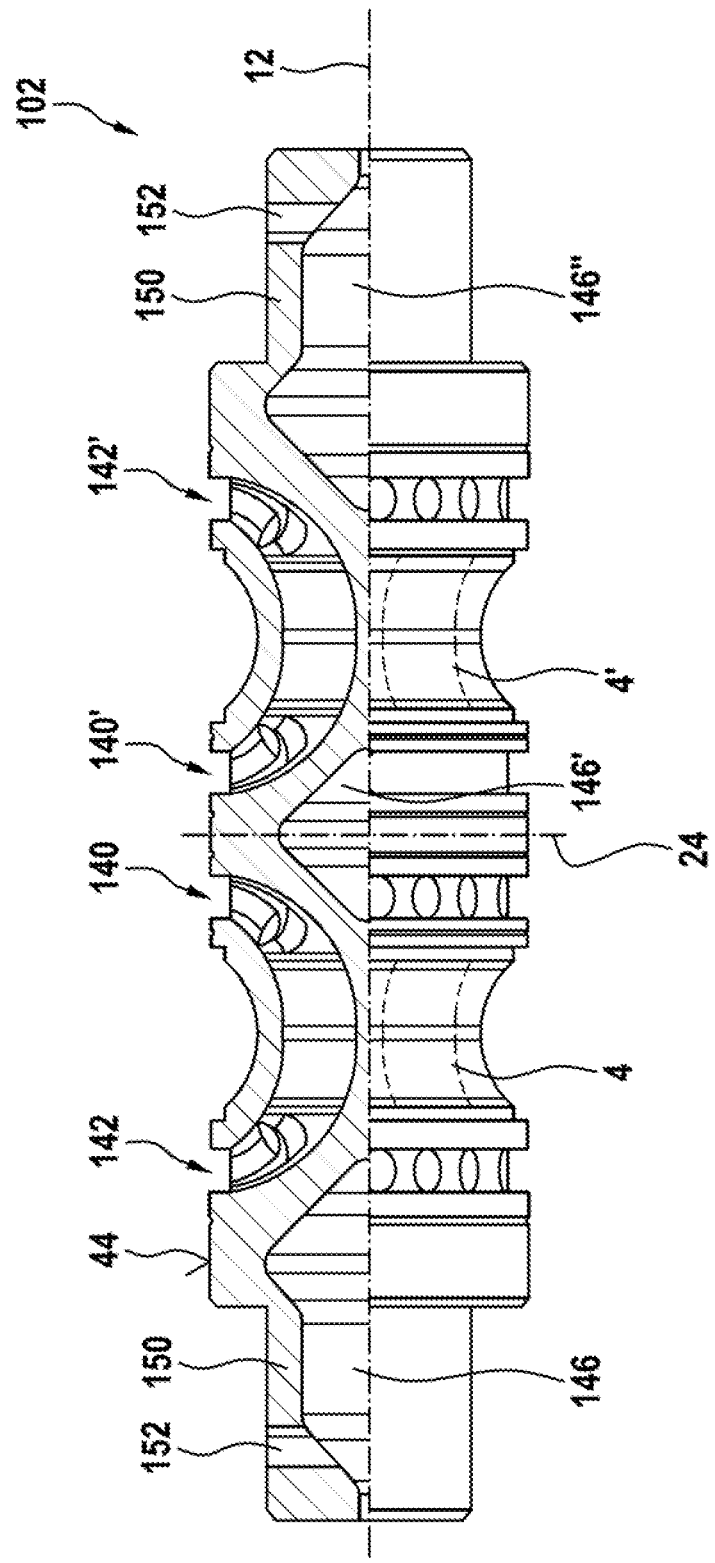
FIG. 3 shows a valve body according to the disclosure in a longitudinal section according to a second exemplary embodiment.

FIG. 3 shows a second exemplary embodiment of a valve piston 102, which can be used in the valve 1 or 101 as an alternative to the valve piston 2. It has some modifications compared to the valve piston 2 according to FIG. 2, which will be explored first. Its cavity 146, 146', 146" does not extend all the way through along the central axis 12 but, unlike in the valve piston 2, is formed in three parts. Here it is interrupted in the area of the respective passage 4, 4'. The passages 4, 4' are thereby supported by solid material towards the central axis 12 in the area of their central portion and have an increased strength.

In the case of the valve piston 102 according to FIG. 3 an improvement in terms of the flow and pressure loss properties of the passages 4, 4' is achieved in that instead of running in and out radially or perpendicularly to the outer circumferential surface 44, as in the valve piston 2 according to FIG. 2, the orifices 140, 142, 140', 142', run in and out at a shallow angle to the outer circumferential surface 44. As a result, even less turbulence arises in the area of the orifices 140, 142, 140', 142', which reduces the pressure loss.

The three-part cavity 146, 146', 146" in the exemplary embodiment according to FIG. 3 has a self-contained central portion 146' and two outer portions 146, 146", symmetrical with respect to the plane of symmetry 24, in the area of the respective spring pintle 150. These each have a radial bore 152, via which the loose material that has not been additively joined is removed from the outer portions 146, 146". Unlike the spring pintle 150 according to FIG. 2, the spring pintle 150 according to FIG. 3 is of substantially cylindrical formation with a smaller end-face chamfer. The spring pintle 50 according to FIG. 2 by contrast has a large end-face chamfer.

A valve piston 202 according to FIG. 4 corresponds substantially to that according to FIG. 3, for which reason components and geometries that remain unchanged are provided with the same reference numerals. In a departure from the exemplary embodiment according to FIG. 3, a spring pintle 250 of solid material is additively joined as semi-finished product to the rest of the valve piston 202. Accordingly, an outer portion 246" of the cavity located there is shortened in the direction of the central axis 12.

A valve piston for a valve is disclosed, which has an internal passage that at least in portions is manufactured additively and has orifices on the external circumference of the valve piston. The passage here is formed for optimization of the flow in such a way that it extends along the central axis and its central portion is arched towards the central axis.

A valve is furthermore disclosed having a valve housing and a housing recess, in which this valve piston is received so that it is adjustable relative to the valve housing.

The invention claimed is:

1. A valve piston having a central axis, the valve piston comprising:
   mutually spaced control geometries provided along the central axis, the mutually spaced control geometries configured to control a hydraulic fluid connection; and
   a passage that extends within the valve piston and bypasses the mutually spaced control geometries, the passage delimited toward the central axis such that the central axis does not pass through a cross-section of the passage, and such that the passage is not in fluid communication within the piston with any portion of the piston through which the central axis passes.

2. The valve piston according to claim 1, wherein the valve piston is additively manufactured with at least one inserted semi-finished product or insert.

3. The valve piston according to claim 1, wherein the passage has at least one portion which is bellied or extends with a convex shape toward the central axis.

4. The valve piston according to claim 3, wherein the at least one portion is, in a stroke direction of the valve piston, a central portion of the passage.

5. The valve piston according to claim 1, wherein the passage comprises a system of hydraulic fluid ducts.

6. The valve piston according to claim 1, wherein the passage comprises a collecting duct having one of an annular cross section and a sectorial cross section.

7. The valve piston according to claim 1 further comprising:
   an outer circumferential surface in which orifices of the passage are defined on a first side of a first control geometry of the mutually spaced control geometries and on a second side of a second control geometry of the mutually spaced control geometries.

8. The valve piston according to claim 7, wherein:
   the orifices are directed into the valve piston; and
   at least one of a first set of the orifices arranged on the first side of the first control geometry are directed toward a second set of the orifices arranged on the second side of the second control geometry, and the second set of the orifices are directed toward the first set of the orifices.

9. The valve piston according to claim 1 further comprising:
   at least one cavity that is, at least in portions, manufactured additively.

10. The valve piston according to claim 9, wherein at least the one cavity extends at least along a portion of the central axis and around the central axis.

11. The valve piston according to claim 9, wherein:
   the passage has at least one portion which is bellied or extends with a convex shape toward the central axis and the at least one portion of the passage is, in a stroke direction of the valve piston, a central portion of the passage, and
   wherein the cavity extends along a portion of the central axis other than the central portion.

12. The valve piston according to claim 9, wherein:
the at least one cavity has at least one outlet opening arranged on an external circumference or at an axial end face; or
the at least one cavity is closed.

13. The valve piston according to claim 1 further comprising:
a central control flange which extends on both sides of a central plane, a normal of the central plane being the central axis,
wherein a series, comprising at least a first control geometry and a second control geometry of the mutually spaced control geometries, and the at least one passage, is formed on either side of the central control flange.

14. A valve comprising:
a valve housing defining a housing recess with a recess central axis;
a valve piston received in the housing recess and having a piston central axis aligned with the recess central axis, the valve piston comprising:
mutually spaced piston control geometries provided along the piston central axis, the mutually spaced piston control geometries configured to control a hydraulic fluid connection; and
a passage that extends within the valve piston and bypasses the mutually spaced piston control geometries, the passage delimited toward the central axis such that the central axis does not pass through a cross-section of the passage, and such that the passage is not in fluid communication within the piston with any portion of the piston through which the central axis passes;
at least two mutually spaced housing recess control geometries provided on the housing recess along the piston central axis, each of the at least two mutually spaced housing recess control geometries being assigned to one of the mutually spaced piston control geometries;
a first pressure chamber defined on a first side of a first housing recess control geometry of the mutually spaced housing recess control geometries;
a second pressure chamber defined on a second side of a second housing recess control geometry of the mutually spaced housing recess control geometries; and
a third pressure chamber defined in the valve housing between the first and second housing recess control geometries,
wherein, in at least one position of the valve piston, the first pressure chamber has a fluid connection to the second pressure chamber via the passage, bypassing the mutually spaced piston control geometries.

15. The valve according to claim 14, wherein:
the first pressure chamber is configured to be connected to a hydraulic fluid source, and the second pressure chamber is configured to be connected to a hydraulic fluid sink; and
the third pressure chamber is configured to be connected to a working connection of the valve.

16. The valve according to claim 15, wherein the hydraulic fluid source is a high-pressure chamber and the hydraulic fluid sink is a low-pressure chamber or a tank pressure chamber.

* * * * *